US005257774A

United States Patent [19]

Dykstra

[11] Patent Number: 5,257,774

[45] Date of Patent: Nov. 2, 1993

[54] POWER ACTUATED PULL CLAMP

[75] Inventor: Henry Dykstra, Milford, Mich.

[73] Assignee: Delaware Capital Formation, Inc., Wilmington, Del.

[21] Appl. No.: 980,333

[22] Filed: Nov. 22, 1992

[51] Int. Cl.[5] B23Q 3/03

[52] U.S. Cl. 269/32

[58] Field of Search 269/24, 32, 93, 94, 269/237, 238, 239, 20

[56] References Cited

U.S. PATENT DOCUMENTS

| | | | |
|---|---|---|---|
| 928,657 | 7/1909 | Howell | 269/93 |
| 3,347,542 | 10/1967 | Mericle | 269/32 |
| 4,174,828 | 11/1979 | Bergman | 269/20 |
| 4,240,620 | 12/1980 | Tunkers | 269/32 |
| 4,445,675 | 5/1984 | Kitaura | 269/20 |
| 4,494,739 | 1/1985 | Valentine | 269/32 |
| 5,165,670 | 11/1992 | Sawdon | 269/32 |

*Primary Examiner*—Robert C. Watson
*Attorney, Agent, or Firm*—Lloyd M. Forster

[57] ABSTRACT

Power actuated pull clamp having piston actuated external side links for pulling a pivoted clamp arm into clamping position. A generally cylindrical body having an external adjustable mounting thread has longitudinal side flats accommodating the actuating links within the thread circumference.

19 Claims, 5 Drawing Sheets

POWER ACTUATED PULL CLAMP

BACKGROUND OF THE INVENTION

Fluid pressure actuated pivoted clamp arms are known in the art, for example, such as illustrated in U.S. Pat. No. 5,115,110 wherein an hydraulically actuated spring release base mounted clamp is disclosed. In such case, a central short stroke hydraulic cylinder produces pivotal clamp engagement of dual laterally spaced clamp arms, the pivots of which can be laterally retracted to clearance position upon release of hydraulic pressure. A cross-shaft having a flatted engagement by the rigidly mounted cylinder piston head and a pivot cross-shaft having flatted ends adapted to slide in slotted keyways upon release of actuating pressure provide lateral movement of the clamp arm assembly to a clearance position while the actuating cylinder remains in a fixed position.

BRIEF DESCRIPTION OF THE PRESENT INVENTION

One embodiment of the power actuated pull clamp disclosed herein employs a fluid pressure actuated piston to actuate external pivotally connected side links which extend to a pivotal connection on a clamp arm anchored by a spaced pivotal connection on the clamp body. The body is provided with an external cylindrical mounting thread coaxial with the actuating piston. The cylindrical mounting is interrupted by a pair of opposed linear side flats providing space within the thread circumference for a pair of actuating links. The piston is actuated by fluid pressure at one end providing a tension pull actuation of the side links in pivoting the clamp arm to a clamping position. Alternatively, the piston may be spring returned to a clamp release position or pressure actuated in both directions. Pressure seals are provided at one or both pressure actuated ends of the piston with the intermediate central body of the piston providing a guide for the actuating links which are engaged by a crosspin through the piston passing through slots in the body extending for the length of piston travel.

In a second embodiment, a similar internal actuating construction is applied to a body having a side mounting provision instead of an external mounting thread.

DETAILED DESCRIPTION OF FIRST EMBODIMENT

Figure 1:
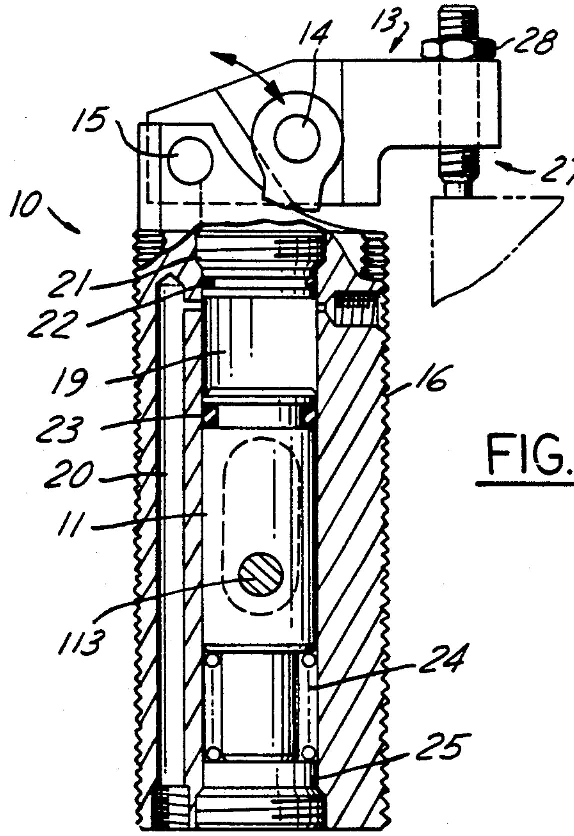
FIG. 1 is a sectional view of the clamp assembly of the first embodiment.

With reference to FIGS. 1–4, the first embodiment includes as principal components body 10, piston 11, actuating links 12, piston actuated link pivot crosspin 113, clamp arm link actuated crosspin 14 and clamp arm pivot body engaging crosspin 15.

Figure 5:
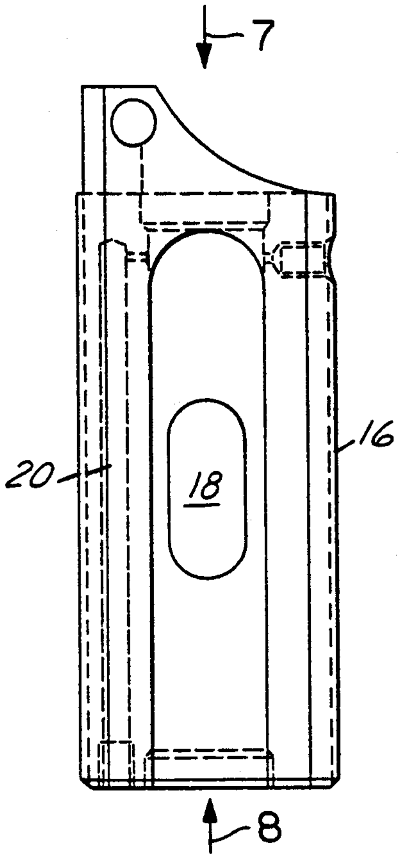
FIG. 5 is a side elevation of the clamp body per se.
Figure 6:
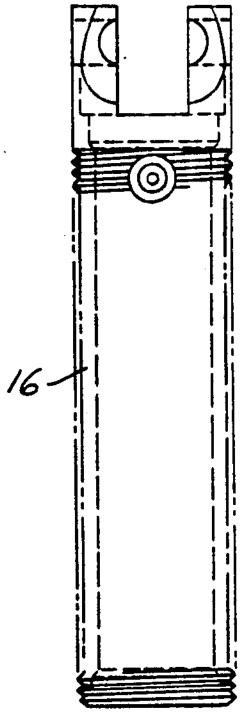
FIG. 6 is an end elevation of the clamp body shown in FIG. 5.
Figure 7:
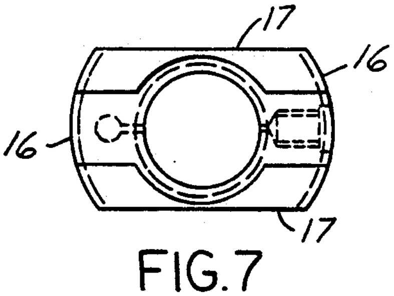
FIG. 7 is a top view of the body along line 7 in FIG. 5.
Figure 9:
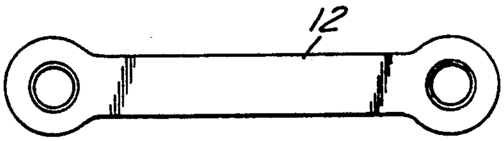
FIG. 9 is a side elevation of an actuating link per se illustrated in the assembly views of FIGS. 2 and 3.
Figure 10:
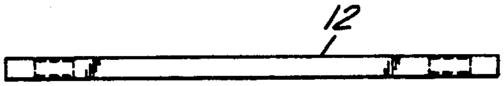
FIG. 10 is a view of the actuating link per se of FIG. 9 as shown in the assembly view of FIG. 4.

Body 10 is provided with an external mounting thread 16 extending the full length of the body circumferentially interrupted by longitudinal flats 17 on either side providing space within the thread circumference for actuating links 12 connected to piston 11 by crosspin 113 extending through slots 18 in body 10 as best shown in FIG. 5.

Figure 2:
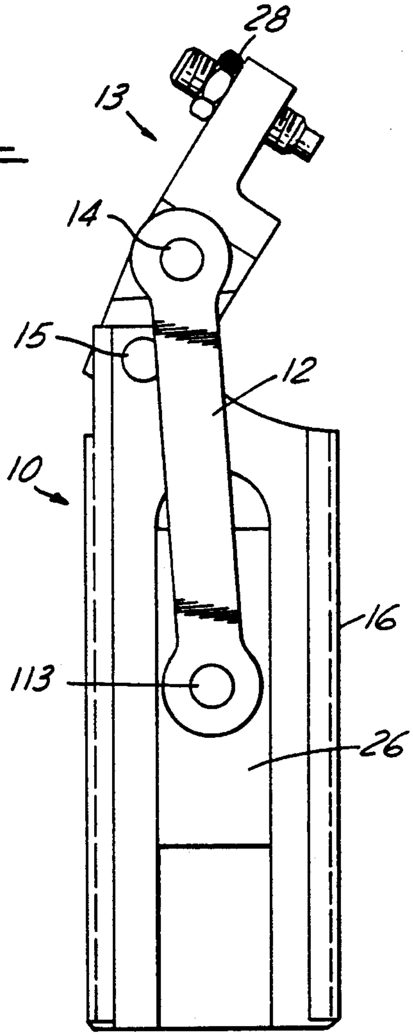
FIG. 2 is a side elevation of the FIG. 1 clamp assembly shown in open position.
Figure 3:
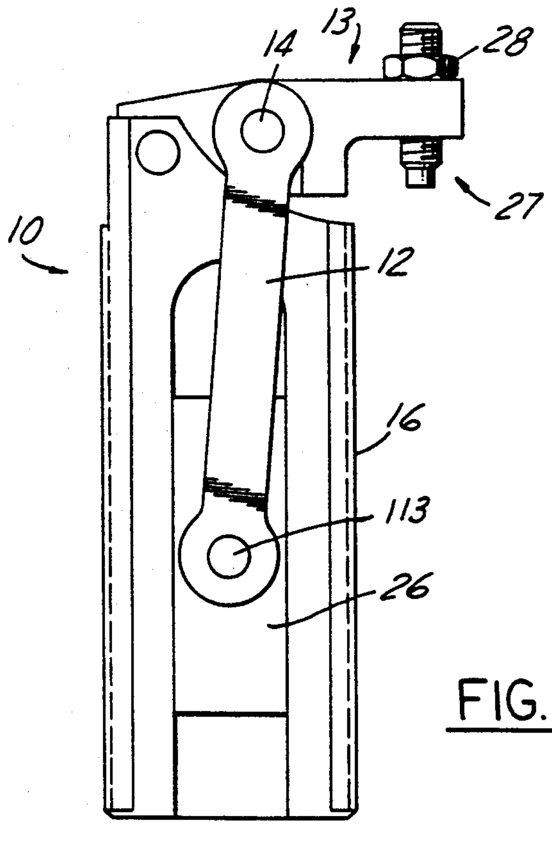
FIG. 3 is a side elevation similar to FIG. 2 showing the clamping position.
Figure 4:
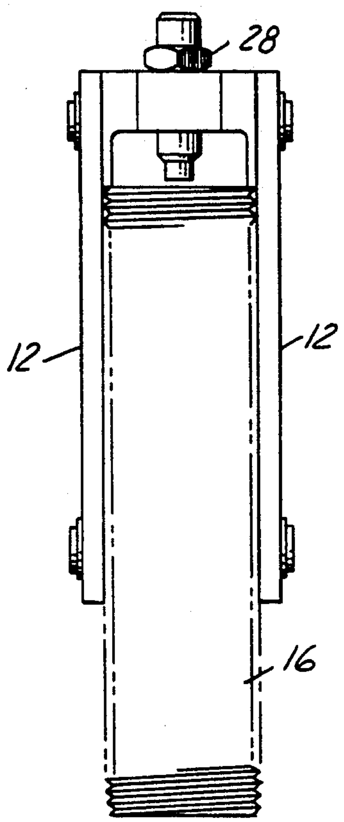
FIG. 4 is an end elevation of the clamp shown in FIG. 3.
Figure 8:
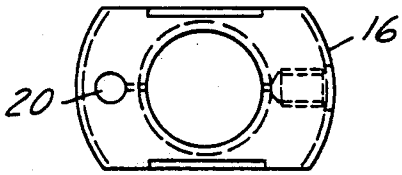
FIG. 8 is a bottom view of the body along line 8 in FIG. 5.
Figure 11:
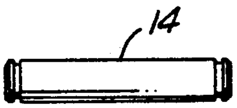
FIG. 11 is a side elevation of the crosspin extending through the center of the clamp arm.
Figure 12:
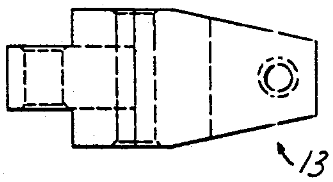
FIG. 12 is a plan view of the clamp arm per se shown in the assembly views of FIGS. 1 and 3.
Figure 14:
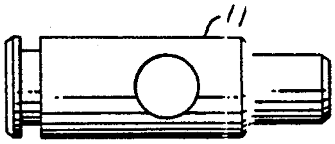
FIG. 14 is a side elevation of the piston per se shown in the sectional view of FIG. 1.
Figure 16:
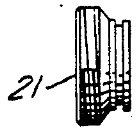
FIG. 16 is a side elevation of the end cap per se shown at the fluid pressure actuating end of the piston illustrated in the assembly view of FIG. 1.
Figure 13:
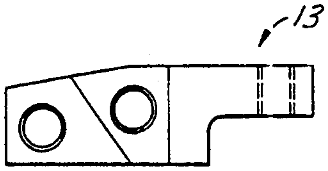
FIG. 13 is a side elevation of the clamp arm per se as shown in FIGS. 1 and 3.
Figure 15:
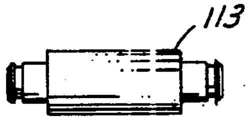
FIG. 15 is a side elevation of the pivot pin per se for piston connection to the actuating links.
Figure 17:
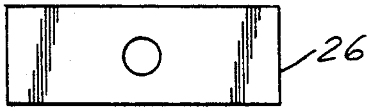
FIG. 17 is a view of the shield shown in the assembly views of FIGS. 2 and 3 covering the slot for the actuating crosspin.
Figure 19:
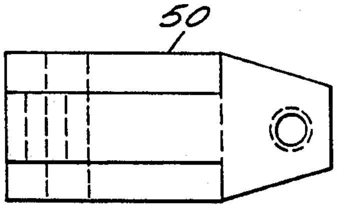
FIG. 19 is a plan view of the clamp arm per se shown in FIG. 18.
Figure 18:
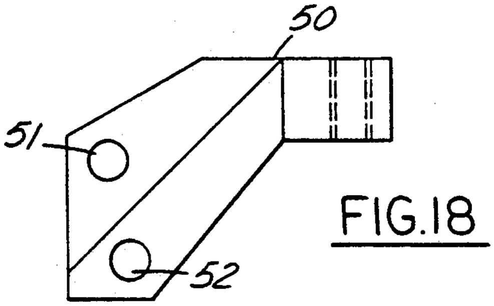
FIG. 18 is a side elevation of an alternative clamp arm per se for that shown in the assembly views of FIGS. 1, 2 and 3.
Figure 20:
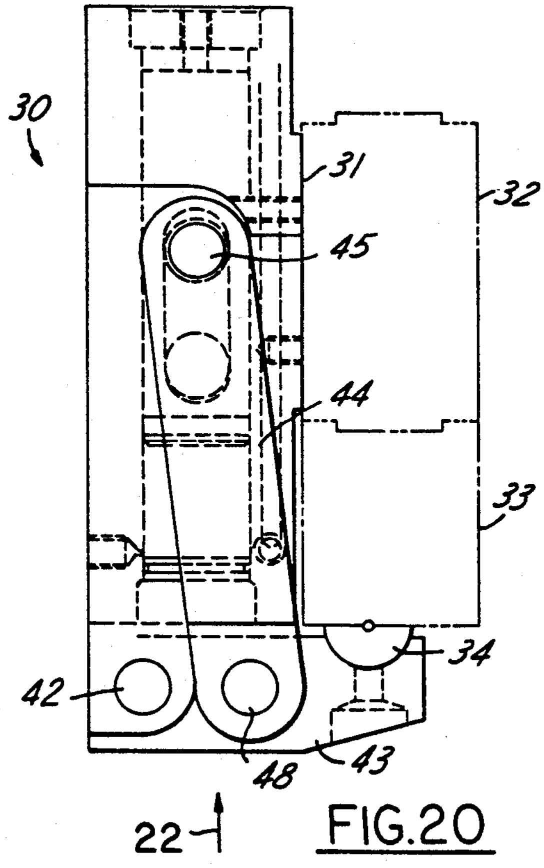
FIG. 20 is a side elevation of a second embodiment corresponding to the FIG. 3 illustration of the first embodiment.

Piston 11 is actuated by fluid pressure connected to housing bore 19 through passage 20 in the body as best shown in FIGS. 5 and 8. Such pressure is sealed by end cap 21 having bore engaging O-ring 22, together with piston O-ring 23 as shown in FIG. 1. Fluid pressure introduced into bore 19 actuates piston 11 to pull links 12 and clamp arm 13 into clamping position as illustrated in FIGS. 1 and 3 while return spring 24, reacting against end cap 25, returns clamp arm 13 to release position as shown in FIG. 2 upon release of fluid pressure from piston bore 19. Shields 26 shown in FIGS. 2, 3, and 17 are provided to cover slots 18 on both sides of clamp body 10. A cylindrical body portion of piston 11 extending between O-ring seal 23 and spring 24 provides a guide within the bore of body 10 for linear travel of crosspin 113 and actuating links 12 between the open and close positions shown in FIGS. 2 and 3.

From the above description it will be understood that interrupted mounting thread 16 provides a full length range of mounting adjustment for a matching threaded base to provide required initial spacing for clamp spindle 27, preferably adapted with a swivel point relative to a workpiece in the base, with secondary adjustment provided by threaded spindle 27 and locknut 28.

Figure 21:
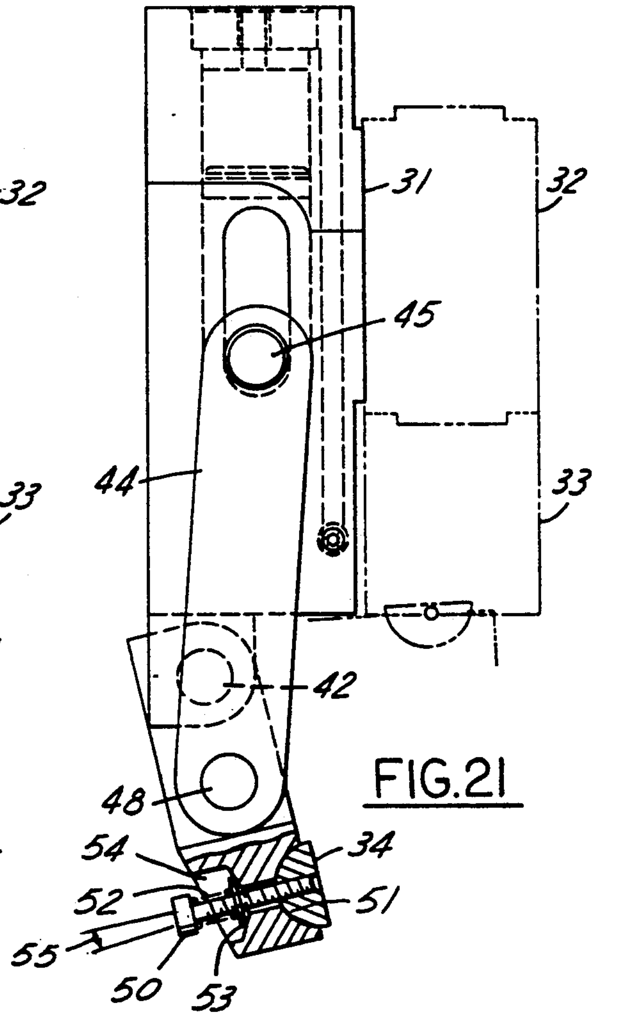
FIG. 21 is a side elevation of the second embodiment of FIG. 20 shown in open position.
Figure 22:
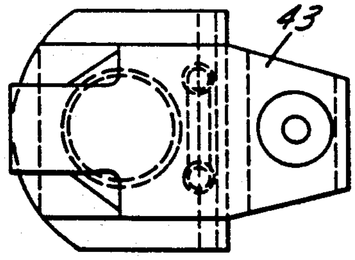
FIG. 22 is a bottom view of the second embodiment taken along the line 22 of FIG. 20.

With reference to FIGS. 20-28 illustrating the second embodiment disclosed herein, clamp body 30 is provided with side mounting surface 31 for mounting on external base 32 to provide a clamp for workpiece 33 engaged by swivel point 34. Open position is shown in FIG. 21.

Figure 23:
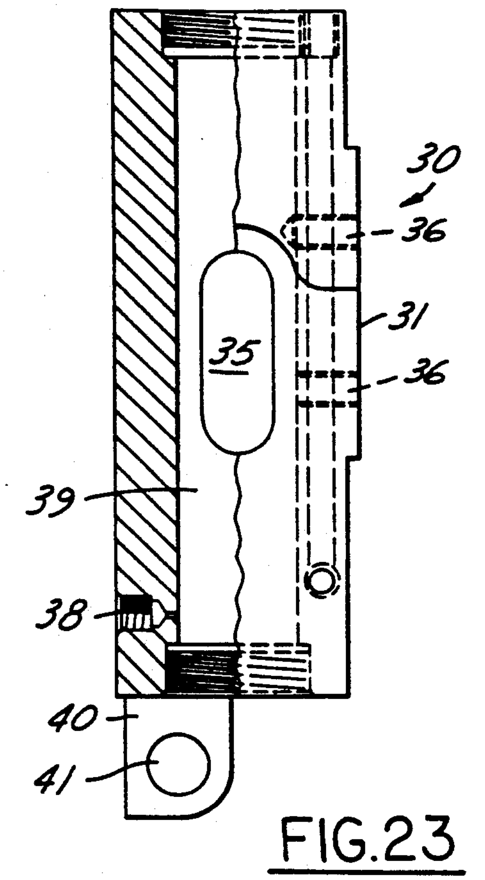
FIG. 23 is a partially sectioned view of the clamp body per se of the second embodiment.
Figure 24:
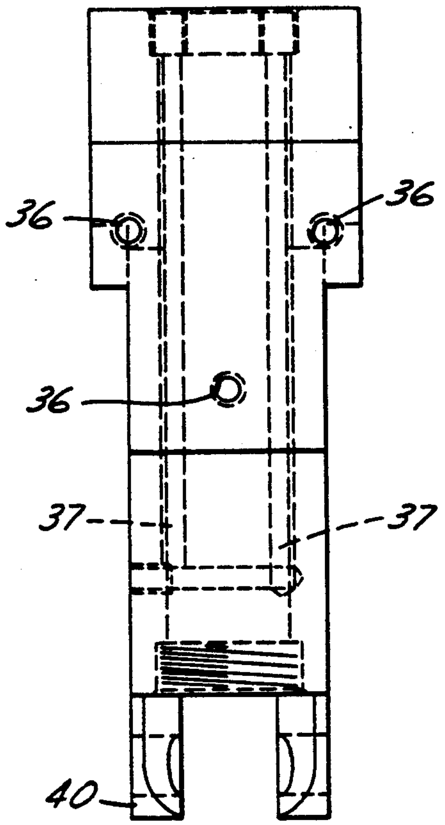
FIG. 24 is a face view of the body per se illustrated in FIG. 23.
Figure 25:
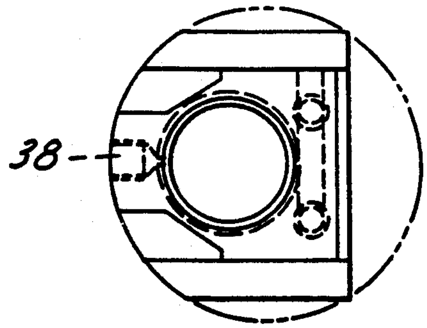
FIG. 25 is a bottom view of the clamp body per se illustrated in FIG. 23.
Figure 27:
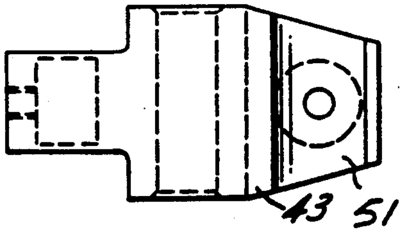
FIG. 27 is a bottom view of the clamp arm per se shown in the assembly of FIG. 20.
Figure 26:
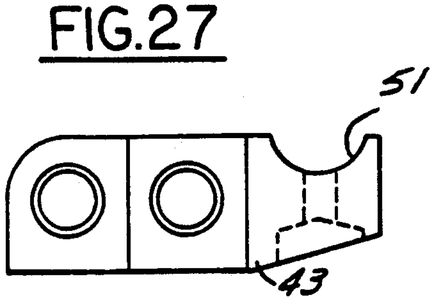
FIG. 26 is a side elevation of the clamp arm per se shown in the assembly of FIG. 20.

With reference to FIGS. 23-25, body 30 per se is illustrated in partial section in FIG. 23 showing side slot 35, and in the respective figures, three tapped mounting holes 36, two fluid passage ways 37, and inlet 38 communicating with one end of piston bore 39.

Figure 28:
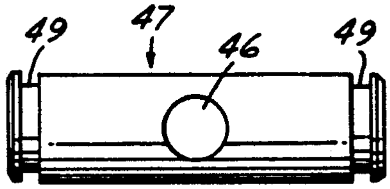
FIG. 28 is a side view of the piston per se employed in the second embodiment corresponding to the piston shown in FIGS. 1 and 14 of the first embodiment.

Integral projecting ends 40 provide crosspin mounting holes 41 for crosspin 42 and clamp arm 43 actuated by links 44 driven by crosspin 45 extending through hole 46 in piston 47 as illustrated in FIG. 28. Pin 48 through links 44 and clamp arm 43 complete the drive from piston 47 in a manner similar to the first embodiment. In this case, however, piston 47 is provided with O-ring grooves 49 at both ends to provide seals for fluid pressure actuation in both directions.

As shown in FIG. 21, swivel point 34 is retained by cap screw 50 in cylindrical socket 51 biased by spring 52 bearing against washer 52 within clearance bore 54 to accommodate limited swivel angle 55.

I claim:

1. Power actuated pull clamp comprising generally cylindrical clamp body, coaxial internal piston, clamp arm pivotally connected to said body, actuating linkage for said clamp arm driven by said piston, and means for mounting said body on a fixed base for supporting a workpiece to be clamped by said clamp arm, characterized by said body having an external mounting thread for adjustably engaging an internal cylindrical mounting thread provided in said base and by said actuating linkage including pivoted links for pulling said clamp arm into clamping position.

2. Clamp of claim 1 including flatted body sides for accommodating a pair of external side links within the circumference of said mounting thread.

3. Clamp of claim 2 including slots in said body, and crosspin in said piston extending through said slots for driving said external side links.

4. Clamp of claim 3 including fluid passage means in said body leading to one end of said piston.

5. Clamp of claim 4 including sealing means at said end of said piston for excluding actuating pressure from said body slots.

6. Clamp of claim 5 wherein fluid pressure at said piston end drives the piston and pulls said links into a clamping direction.

7. Clamp of claim 6 including spring release means at the other end of said piston for returning said piston and linkage in a clamp releasing direction.

8. Clamp of claim 6 including fluid pressure actuating means at both end of said piston.

9. Clamp of claim 5 including shields engaged by said piston crosspin for covering said body slots.

10. Clamp of claim 3 including body yoke pivotal mounting for said clamp arm.

11. Clamp of claim 10 including dual side links pivotally connected at one end to said piston and at the other end to said clamp arm.

12. Power actuated pull clamp comprising clamp body having internal fluid pressure actuated linear piston, clamp arm pivotally connected to said body, actuating linkage for said clamp arm driven by said piston, and means for mounting said body on a fixed base for supporting a workpiece to be clamped by said clamp arm, characterized by said body having a side mounting surface for engaging a matching side surface of a base for supporting a workpiece to be clamped, and by said actuating linkage including pivoted links for pulling said clamp arm into clamping engagement, and including external side linkage slots in said body, a crosspin extending through said piston and slots for driving said links, and fluid passage means in said body providing means for piston actuation.

13. Clamp of claim 12 including external side linkage slots in said body, a crosspin extending through said piston and slots for driving said links, and fluid passage means in said body for actuating said piston in both directions.

14. Clamp of claim 13 including piston ends' sealing means for separating actuating pressure from said body slots.

15. Clamp of claim 12 including a shield covering each of said slots engaged by said piston crosspin.

16. Clamp of claim 12 including a yoke body mounting for said clamp arm.

17. Clamp of claim 12 including dual side link pivotal connections to said clamp arm.

18. Clamp of claim 12 including a swivel workpiece engaging point at the end of said clamp arm.

19. Clamp of claim 18 including a cylindrical bearing for said swivel point, a cap screw extending through the end of said clamp arm with clearance for limited swivel movement for retaining said swivel point in said bearing, and resilient means biasing said swivel point into bearing engagement.

* * * * *

UNITED STATES PATENT AND TRADEMARK OFFICE

CERTIFICATE OF CORRECTION

PATENT NO. : 5,257,774

DATED : November 2, 1993

INVENTOR(S) : Henry Dykstra

It is certified that error appears in the above-identified patent and that said Letters Patent is hereby corrected as shown below:

Column 3, line 35, "52" should be --53--.

Signed and Sealed this

Second Day of August, 1994

Attest:

BRUCE LEHMAN

Attesting Officer

*Commissioner of Patents and Trademarks*